2 Sheets—Sheet 1.

Z. D. WATERS.
CORN PLANTER.

No. 181,294. Patented Aug. 22, 1876.

Witnesses:
John Reif
James Y. Sample

Inventor:
Z. D. Waters by
W. M. Scott atty

N. PETERS, PHOTO-LITHOGRAPHER, WASHINGTON, D. C.

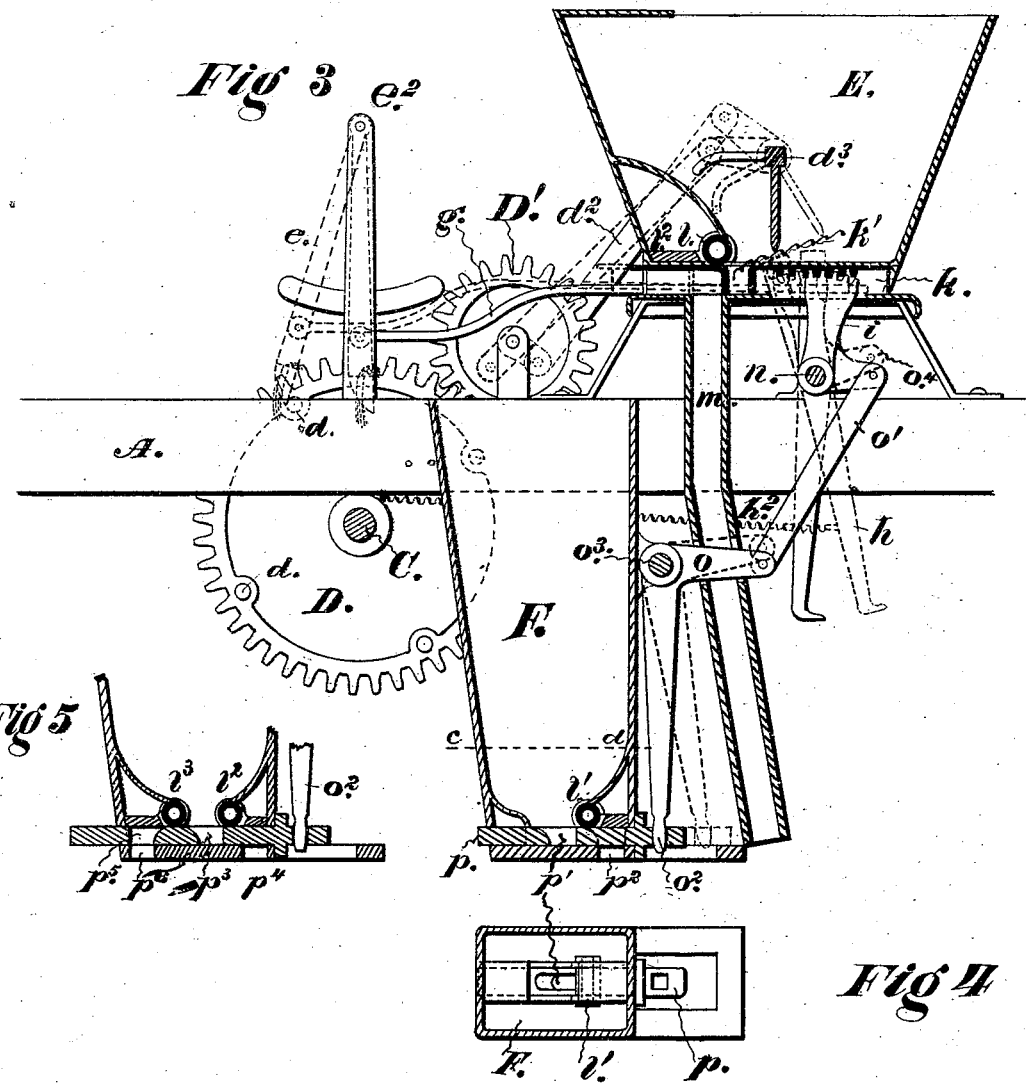
Z. D. WATERS.
CORN PLANTER.
No. 181,294. Patented Aug. 22, 1876.
2 Sheets—Sheet 2.
Witnesses:
John Reif
James J. Sample
Inventor:
Z. D. Waters by
A. M. Stout atty.

UNITED STATES PATENT OFFICE.

ZACHARIAH D. WATERS, OF BROOKVILLE, MARYLAND.

IMPROVEMENT IN CORN-PLANTERS.

Specification forming part of Letters Patent No. 181,294, dated August 22, 1876; application filed May 31, 1876.

*To all whom it may concern:*

Be it known that I, Z. D. WATERS, of Brookville, county of Montgomery, and State of Maryland, have invented certain Improvements in Machines for Planting Corn, of which the following is a specification:

My invention relates generally to the construction and the combination of the parts of a machine to plant automatically and in regulated quantities both seed and a fertilizer in the same hills, which are equidistant apart, the fertilizer being dropped just after the corn, a furrow-opener preceding the droppings and opening a single furrow, while two coverers follow and cover them with soil, and all is done at one operation.

All the operative parts of my machine are mounted upon a suitable frame, which is carried by two wheels upon a revolving axle, from and by which all the motion is imparted except the general motion of the carriage.

My said machine will be more fully described with reference to the accompanying drawings, in which—

Figure 1:
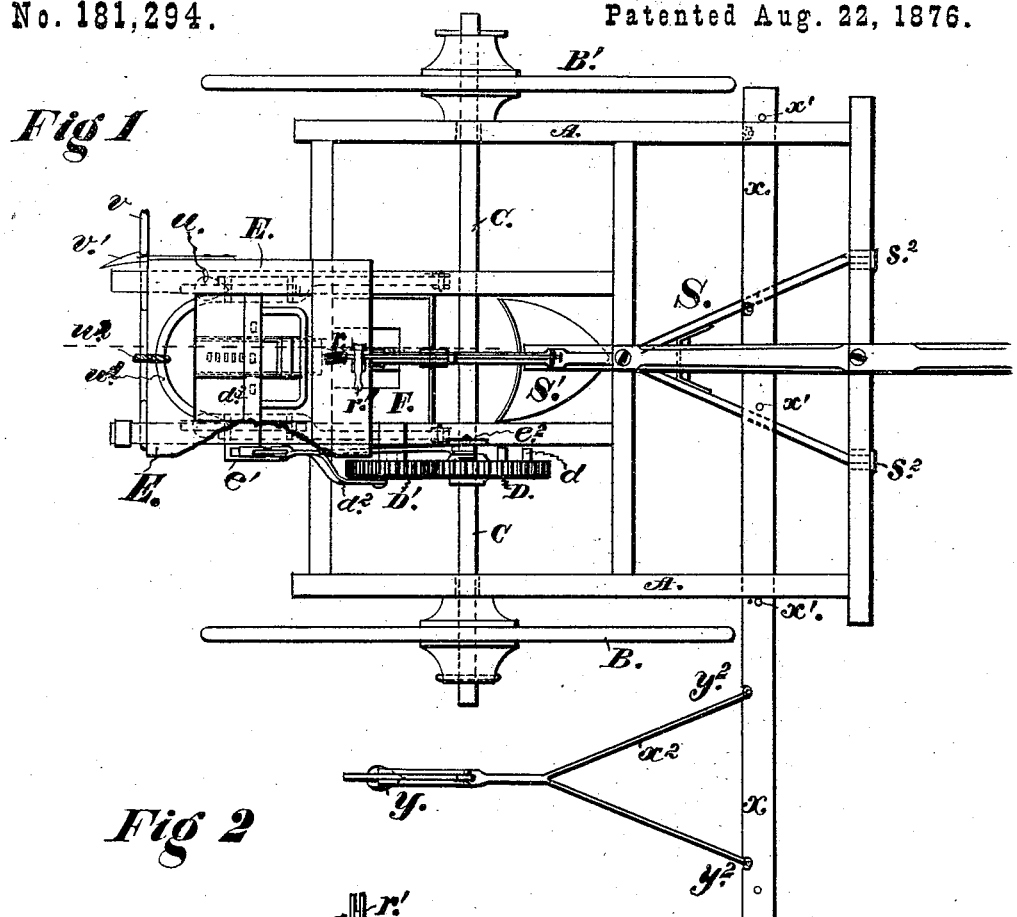
Figure 2:
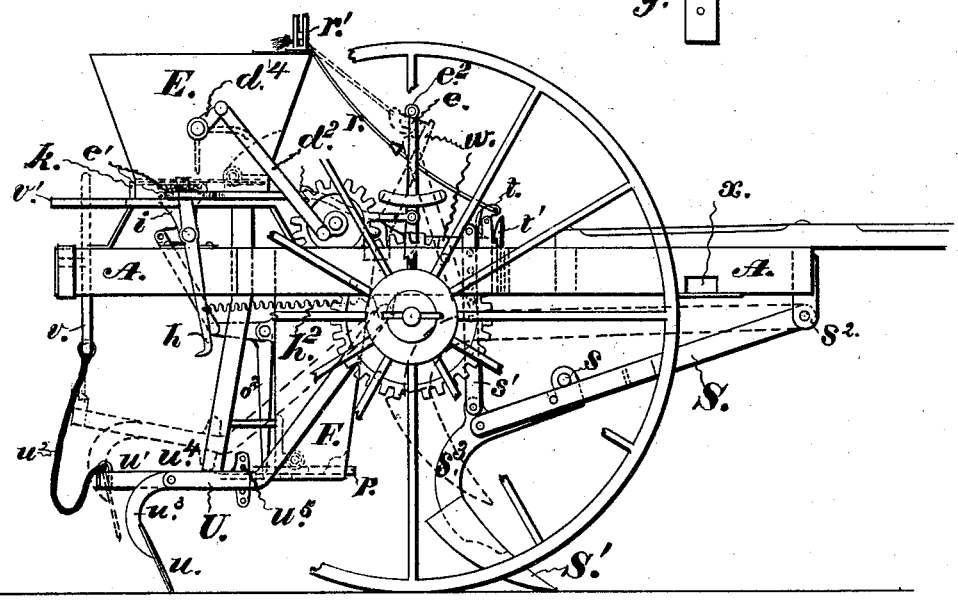

Figure 1 represents a plan of a machine embracing my said improvements; Fig. 2, a side elevation of the same, the tongue being to the right and the wheel being partly broken away; Fig. 3, a longitudinal vertical section of the same, the tongue being to the left; Fig. 4, a horizontal section of the corn-hopper F, and plan of the dropping-bar and its frame; Fig. 5, a detail view of the dropping-bar, and Fig. 6 a cross-section of the hollow india-rubber cylinder-spring $l^1$.

A indicates the frame; B, the off wheel, which turns the axle C; B', the near wheel, which turns upon the axle C. D is a circular disk, provided with teeth on its periphery, and is fastened upon the axle C, so as to turn therewith, and D' is a toothed pinion, turning upon its journal upon the frame, and meshing with the teeth upon disk D. Arm $d^2$ is connected with pinion D' by means of a wrist-pin standing out perpendicularly from the outer face of the pinion near its periphery, and to the shaft $d^3$ of the stirring-fingers by means of a crank-lever, which shaft passes through and has its bearings in the walls of the hopper E for the fertilizer, so that every revolution made by the pinion causes the said fingers to vibrate and stir up the fertilizer, so that it may be always in a divided condition, and ready to fall into the opening $k'$ in the feed-slide $k$. The disk D is provided with a series of studs, $d$ $d$, standing upon its inner face, perpendicular thereto and near its periphery, and equidistant apart. When the disk revolves, these studs engage with and drive forward the lower end of swinging arm $e$, which is pivoted at its upper end to the top of post $e^2$, which is secured upon the frame, and said swinging arm is hinged to the horizontal slotted bar $g$, the slotted end of which incloses the upper end of vertical levers $h$, which are fixed upon the horizontal shaft $n$, and this last-named shaft has fixed upon it, in a vertical position, an arm, terminating in a toothed sector, $i$, the teeth of which work into corresponding indentations on the under side of the feed-slide $k$, which slides back and forth in its box in the bottom of the hopper for discharging the fertilizer, as shown.

From the lower end of the vertical lever $h$ a spiral spring, $h^2$, extends back to near the axle, and is fastened to the frame. Now, when the disk revolves, and one of the pins $d$ engages with the lower end of the swinging arm $e$ and drives it forward, carrying the feed-slide also, it does so against the opposing force of the spiral spring $h^2$, and therefore, as soon as the stud becomes disengaged, the force of that spring, with a snap, pulls back the swinging arm, the vertical levers, and the feed-slide to their original positions, respectively, and a dropping of the fertilizer will have been made.

The feed-slide is provided with a vertical opening through it, like the interior of a cup, and while that opening is under the mass of the fertilizer, the latter falls into the opening by its own weight, and fills it, and then, as the slide is driven forward, the rubber tube-spring $l^1$, which is fastened to spring-plate $l^2$, which extends down from a wall of the hopper, separates this cupful from the mass, and when the opening is drawn so far forward as the hole in the bottom of the hopper, the whole drops through into the spout $m$, and thence into the furrow made by the opener $S^1$. This rubber tube-spring upon its spring metal plate is peculiarly well adapted to separate the single droppings from the mass without choking or breaking any of the parts. The bottom of the hopper serves as a bottom for the cup until the contents are driven into the hole in the bottom of the hopper. The quantity of the single droppings may be, of course, increased or diminished by increasing or diminishing the capacity of the opening. Now, the same shaft, $n$, which operates the vertical levers $h$ before mentioned, and effects the reciprocation of the dropping-slide for the fertilizer, also gives similar and simultaneous motion to the feed-slide $p$ in the corn-hopper F, as shown in Figs. 3 and 4. That same motion is transmitted from the arm $o^4$, extending out from shaft $n$ and link $o^1$ hinged thereto, and also to bell-crank lever $o$, which vibrates on its shaft $o^3$. The lower end of lever $o$ passes through the rear end of the feed-slide, and reciprocates the same. $p^1$ is the opening in the feed-slide; $p^2$, the hole in the bottom of the hopper, and $l^1$ is the rubber tube mounted on the lower end of the spring-plate, and the action of this dropping device is precisely the same as the one for dropping the fertilizer, and hereinbefore described. The blade or shovel $S^1$, for opening the furrow, is attached to the helve $S^3$ of a beam, S, which is hinged under the forward end of the frame at $S^2$.

The helve is pivoted between the two plates composing the forked beam S, and $s$ is a wooden pin, which will break and allow the blade to swing back without breaking the blade, in case the latter were run against an embedded stone or a stump, and the whole is swung upon double bar $s'$, which embraces one of the longitudinal bars of the frame and lever $w$, which is pivoted on the top thereof. That lever, when the spring-catch is down, holds the blade down in position for use; but when it is desired that the blade shall be above the surface, the lever $w$ is lodged with its outer end upon the upper end of the spring-catch, as shown. That catch is operated by lever $t$, and the driver may operate that lever by means of a cord, $r$, extending back over hopper E.

The covering apparatus consists of two bars, U, pivoted to the main frame, and the U-shaped bar $u^1$ and the helves $u^3$, bearing the blades $u$, so pivoted together that a wooden pin at $u^5$ will hold the blades in position for use, but will break before allowing the blades themselves to break. The blades are arranged to straddle the furrow and throw the soil into it from either side, to cover the seed and the fertilizer.

The rod $v$, bent into the form of a double crank, and having its bearings in the frame, and connected to bar $u^1$ by a cord or chain, $u^2$, is used to raise and lower the coverers, and the spring-catch $v'$ is used to hold bar $v$ in position when the coverers are up out of the ground.

In order to make a mark while planting one row, as a guide for the machine in planting the next, the bar X in Fig. 1 is passed through horizontal mortises in the side pieces of the frame, and held in position after adjustment by pins through holes $X^1$, and the frame $y$ $x^2$ is hooked into eyes $y^2$ in the bar, and a blade is attached to the frame, in the same manner with the furrow-opener, before described.

The improvements desired to be covered herein are themselves improvements upon my invention embraced in the Letters Patent of the United States granted me dated July 1, 1873, for improvements in corn-planters.

What I claim as my invention, and desire to secure by Letters Patent, is—

1. The combination of the axle C, the disk D, having pins $d$, pinion D′, the slotted horizontal bar $g$, vertical levers $h$, springs $h^2$, shaft $n$, and the upright arm, terminating in toothed sector $i$, adapted to reciprocate feed-slide $l$, provided with indentations upon its under side, substantially as and for the purpose described.

2. The combination of the axle C, the disk D, having the pins $d$, the pinion D′, horizontal slotted bar $g$, vertical bar $h$, springs $h^2$, shaft $n$, rigid arm $o^4$ thereon, link $o^1$, and bell-crank lever $o$ on its shaft $o^3$, adapted to reciprocate feed-slide $p$, substantially as shown and described.

3. The covering apparatus, consisting of the two bars U, and U-shaped bar $u^1$, helves $u^3$, bearing the blades $u$, and the whole hinged to the frame, substantially as and for the purpose described.

Z. D. WATERS.

Witnesses:
JOHN REIF,
P. O'DONNELL.